United States Patent [19]
Sakamoto

[11] Patent Number: 4,672,453
[45] Date of Patent: Jun. 9, 1987

[54] CONTACT TYPE IMAGE SENSOR AND DRIVING METHOD THEREFOR

[75] Inventor: Mikio Sakamoto, Tokyo, Japan

[73] Assignee: NEC Corporation, Tokyo, Japan

[21] Appl. No.: 753,232

[22] Filed: Jul. 9, 1985

[30] Foreign Application Priority Data

Jul. 10, 1984 [JP] Japan .................................. 59-143020
Aug. 6, 1984 [JP] Japan .................................. 59-164445

[51] Int. Cl.$^4$ ............................................. H04N 3/14
[52] U.S. Cl. ................................ 358/294; 358/213.23
[58] Field of Search ............... 358/212, 213, 293, 294; 377/58, 60

[56] References Cited

U.S. PATENT DOCUMENTS 4,288,820 9/1981 Minamibayashi et al. ......... 358/294
4,620,231 10/1986 Kosonocky ........................ 358/213

Primary Examiner—L. T. Hix
Assistant Examiner—David M. Gray
Attorney, Agent, or Firm—Burns, Doane, Swecker & Mathis

[57] ABSTRACT

A contact type image sensor comprising M×N of photodetectors arranged in line and M driving integrated circuits each of which includes a CCD shift register having N stages connected through one transfer gate to the corresponding one of the photodetectors. Each of the driving circuits also has an output amplifier connected to the associated CCD shift register and a switch connected between the output amplifier and a common output line. When all the transfer gates are simultaneously turned on, a photoelectric charge stored in each photodetector is transferred to the corresponding stages of the CCD shift register, and then sequentially read out from the respective CCD shift register by supplying transfer clock pulses to a selected CCD shift register while turning on the switch associated to the selected CCD shift register.

15 Claims, 9 Drawing Figures

CONTACT TYPE IMAGE SENSOR AND DRIVING METHOD THEREFOR

BACKGROUND OF THE INVENTION

1. Field of the Invention

The present invention relates to a contact type image sensor which can be effectively used as a photoelectric conversion device in facsimile machines and others. More particularly, the present invention relates to a low noise contact type image sensor using a plurality of chargetransfer device (CTD) shift registers.

The invention also relates to a method of driving such a image sensor.

2. Description of the Related Art

Conventionally, facsimile machines have been constructed with a small linear image sensor of the MOSIC type or the charge coupled device (CCD) type which has an active length extremely smaller than the width of a document to be read. In such facsimile machines, in order to form an image of the document in a reduced manner on the image sensor, it has been required to locate between the image sensor and the document a reduction optical system having an optical path of a substantial length, so that the machine will inevitably be of a large size. Recently, full document width contact type linear image sensors have been developed. Since the contact type linear image sensor needs only a very short optical path between the image sensor and the document, and does not require any reduction optical system, the facsimile machine can be fabricated with a more compact size and at a lower cost than the conventional machine.

However, the contact type image sensor itself is of a large size because it includes a photodetector array having the same active length as the width of the document to be read. For example, a contact type image sensor for a A-4 size document has to have an active length of 216 mm. In addition, if it needs the resolution of 8 or 16 picture elements/mm, the image sensor is required to have 1728 or 3456 photodetector cells.

Referring to FIG. 1, there is shown one conventional linear image sensor. This linear image sensor is in the form of a hybrid circuit fabricated on a glass substrate. Specifically, the image sensor comprises a large number of photodetectors 1 made of, for example, amorphous silicon and formed on the glass substrate in a straight line. It further includes a plurality of driving integrated circuit chips 2a, 2b, ... and 2n all located on the same glass substrate. Each of the driving IC chips 2a, 2b, ... 2n includes a scanning pulse generating circuit 3a, 3b, ... 3n constituted of, for example, a shift register of 64 or 128 stages, and a number of gate switches 4 constituted of one MOSFET adapted to be turned on and off by the corresponding one stage of the scanning circuit. These gate switches 4 are also connected at its one end to the respective photodetectors 1 in a one-to-one relation and at its other end to a common signal line 5. A clock line 6 is connected to an a clock input of each scanning circuit, and each scanning circuit is connected at its output to an input of the next scanning circuit. Thus, in the condition that a clock $\phi$ is supplied through the line 6 to the clock input of each scanning circuit, if a start pulse $\phi_s$ is applied to an input 7 of the first scanning circuit 3a; the MOSFET gates 4 are sequentially turned on, so that a photosignal stored in the respective photodetectors 1 is read out to the signal line 5. Namely, the image sensor operates in a storage mode.

In such a reading-out, the following two noises are generated: The first is a switching noise generated in the form of a spike by the leakage of the gate driving pulse through a gate-drain capacitance 8 of the MOSFET switch 4. The second noise is a clock noise generated through a parasitic capacitance 9 between the clock line 6 and the signal line 5.

As a light source for the contact type image sensor, a light emitting diode (LED) is widely used. The LED is, however, limitative in the intensity of the emitted light. Therefore, in the case of reading the photosignal at a scanning speed of 5 to 10 msec/line, which is generally required in the facsimile equipment, or at a higher speed, the photosignal obtained is too weak and therefore the signal-to-noise (S/N) ratio is not so high. As the result, noise suppression has been required in order to obtain a sufficient S/N ratio.

For this purpose, Koike et al proposed one noise suppression method in "Improvements of S/N Ratio of MOS Image Sensor by Neighboring Bit Correlation Method", Transactions of Institute of Electronics and Communication Engineerings of Japan, Vol. J 60-C, pages 113 to 120 (1977). As shown in FIG. 2, a pair of MOSFETs 21a and 21b is connected to each photodetector 22, and one of the MOSFETs 21a in each pair is connected to a noise line 23 while the other MOSFET 21b is connected to a signal line 24. In addition, each scanning pulse output stage of the scanning circuit 25 is connected to the gate of the MOSFET 21b which is coupled to one photodetector $22_i$ and also to the gate of the MOSFET 21a which is coupled to one photodetector $22_{i-1}$ just before the photodetector $22_i$ in the scanning direction.

With this arrangement, each two adjacent MOSFET switches 21a and 21b respectively connected to each pair of adjacent different photodetectors $22_{i-1}$ and $22_i$ are simultaneously turned on by a scanning pulse supplied from the scanning circuit 25, so that a signal including a noise is read out on the signal line 24 and only a noises appears on the noise line 23. Therefore, the noise component can be removed from the voltage on the signal line 24 by obtaining the difference in voltage between the lines 23 and 24. Thus, there can be suppressed noises having a fixed pattern, such as the aforementioned switching noise and clock noise.

Turning to FIG. 3, there is shown a second method for noise suppression proposed by Takamura et al. in "Low Noise Linear MOS Image Sensor", National Technical Report, Vol. 21. No. 6, pages 692 to 703 (1975). In this sensor, each photodetector 31 is connected through one MOSFET switch 32 to a signal line 33, and instead of the dummy MOSFET 21a shown in FIG. 2, a MOS capacitor 34 having the same capacitance as the MOSFET switch 32 is connected to each MOSFET switch and a noise line 35. One MOSFET switch 32 and the MOS capacitor 34 connected thereto are simultaneously switched on and off by a scanning circuit 36, so that a signal including a noise is outputted to the signal line 33 and a noise only on the noise line 34, similarly to the lines 23 and 24. The noises can therefore be removed from the signals by obtaining the difference of voltage between the lines 33 and 35.

Besides, Ohba et al. proposed a third method for noise suppression in "Fixed Pattern Noise In an Area Sensor And FPN suppressing Circuit", Television Society Technical Report, Vol. 4. No. 13, pages 53 to 58

(1980). In this method, signal and noise are integrated during the driving period for each photodetector cell so that only a pair of positive and negative noises caused by one scanning pulse are cancelled each other.

Saito et al., moreover, proposed a fourth method in "A-4 16 bits/mm Contact Type High Speed Image Sensor Using an a-Si:H Photodetector Array", Technical Report of Institute of Electronics and Communication Engineers of Japan. ED 83-64, October, 1983. In this method, the gate switch 4 is constituted by a CMOS switch consisting of a pair of series-connected p-channel MOSFET and N-channel MOSFET. A pair of pulses reverse in phase to each other are applied to the respective MOSFETs of the CMOS gate switch, so that noises of opposite polarities to each other appear in the pair of MOSFETs, respectively, but are resultingly cancelled by each other.

Thus, there has recently developed a contact type image sensor for A-4 size which has 16 elements/mm resolution and a S/N ratio of 20 dB at 0.8 msec/line scanning speed. However, any of the above-mentioned various noise suppression methods cannot remove the noise over a certain degree, because of nonuniformity in characteristics of each MOSFET and the clock noise. Because of this, if the image sensor is driven at a speed higher than 0.5 msec/line, the S/N ratio and the resolution become lower. In addition, it is recently desired to reproduce a half tone image in the facsimile. For this purpose, a S/N ratio higher than 40 dB is required for example. Therefore, in the aforementioned noise suppression methods are sufficient to give the required performance to the image sensor.

In the above mentioned methods for driving the linear image sensor, the photodetectors are sequentially read out by the scanning circuit, and therefore, the noise is generated at each reading-out so that the noise cannot be sufficiently suppressed. In order to overcome the problem of the sequential reading of the photodetectors, there has been proposed and used a CCD linear image sensor as shown in FIG. 4. Photodetectors 41 which store electric charges of photosignals are connected through transfer gates 42 to respective stages of a CCD shift register 43. These transfer gates 42 are simultaneously turned on by a transfer pulse $\phi_G$ as shown in FIG. 5, so that a photosignal in each photodetector 41 are simultaneously transferred through the associated gate 42 to the corresponding stage of a CCD shift register 43. Then, the photosignal in each stage of the CCD shift register 43 is serially transferred stage by stage by alternately supplying clock pulses $\phi$ and $\overline{\phi}$ as shown in FIG. 5, so that a photosignal SP as shown in FIG. 5 is outputted from the CCD shift register 43 to an output amplifier 44.

In the reading operation of the CCD image sensor as mentioned above, so-called "feed-through" noise $N_f$ appear in the photosignal as shown in FIG. 5. But, this noise is generated when the transfer gates 42 are triggered. Therefore, the feed-through noise is a fixed pattern noise, and will not appear during the period of time for reading the photosignal of each scanning line from the CCD shift register. Accordingly, it is easy to remove the feed-through noises in a subsequent process of the signals. As seen from the above, the CCD image sensor is free from the fixed pattern noise, as generated in the MOSIC image sensor as shown in FIGS. 1 to 3.

In CCD image sensors recently developed, moreover, it is able to drive the CCD shift register at a transfer clock pulse frequency of 10 MHZ or higher. If such a high speed CCD image sensor is applied to a contact type image sensor for A-4, size having 16 elements/mm resolution, namely, having 3456 photodetector cells, a reading speed of 0.4 msec/line or more can be expected. In addition, by alternately reading photodetector cells arranged in a line by use of a pair of CCD shift registers at a speed of 0.4 msec/line, a speed of 0.2 msec/line or more can be realized.

Furthermore, if a so-called floating gate amplifier is used as the output amplifier 44, the CCD image sensor can have an increased sensitivity, so that it can obtain an S/N ratio higher than the conventional MOSIC image sensor.

However, when there is fabricated a CCD linear image sensor having for example 1728 or 3456 photodetector cells, since a CCD shift register chip having 1728 or 3456 stages is not commercially available, it is necessary to use a plurality of CCD shift register chips. In such a case, when a photosignal for one scanning line is read out by sequentially scanning the respective CCD shift registers, the feed-through noise $N_f$ will inevitably appear at the boundary between the photosignal from one CCD shift register and the photosignal from the next CCD shift register. Therefore, a photosignal for one scanning line will inevitably contain several feed-through noise $N_f$.

In addition, in the case that each of the CCD shift registers is provided at its output with one floating gate amplifier, if all the floating gate amplifiers are directly connected together to a common output line of the image sensor, a short-circuit situation is caused.

Therefore, there is necessity for providing output terminals of the same number as the CCD shift registers used. For example, if each CCD shift register is of 256 stages, a contact type image sensor for A-4 size having 8 or 16 elements/mm resolution needs 7 or 14 output terminals. Such a CCD image sensor becomes complicated in wiring as compared with the MOSIC image sensor, resulting in poor reliability of connection to the external.

Furthermore, the CCD image sensor has a problem of a so-called "image lag". Namely, when the photosignal is small, specifically when the voltage across the photodetector 41 is not greater than 0.3 V, even if the transfer gate 42 is turned on, the electric charge will not be quickly and sufficiently be transferred from the photodetector to the CCD shift register. The voltage across the photodetector is determined by the amount of a photoelectric charge stored in the photodetector and the capacitance of the photodetector. Namely, the voltage across the photodetector is increased by increase of the amount of the photoelectric charge stored in the photodetector, but decreased by the capacitance of the photodetector. In addition, if the capacitance of the photodetector becomes larger than that of each stage of the CCD shift register, the amount of the electric charge transferred from the photodetector to the CCD shift register becomes small.

However, it is actually difficult to make 1 pF or less of capacitance of each photodetector including a capacitance of the associated distributing wire et al. On the other hand, in the case that a contact type image sensor for A-4 size having 16 elements/mm resolution and using a yellow green (wavelength 570 nm) LED having 100 lx in illuminance at the sensor surface is driven at the scanning speed of 1 msec/line, the photoelectric charge is merely about 0.2 pC per photodetector. As a result, the voltage across the photodetector will be only 200 mV. Additionally, the capacitance of the photodetector such as a-Si type photodetector cell is generally larger than that of the CCD type image sensor. Therefore, in the case that a-Si photodetectors are directly connected to the CCD shift register, the above mentioned image lag will occur, and therefore, a sufficient sensitivity cannot be obtained.

SUMMARY OF THE INVENTION

It is, therefore, an object of the present invention to provide a contact type image sensor which is free from the problems as mentioned above.

Another object of the present invention is to provide a low noise contact type image sensor capable of being driven at a high speed.

A further object of the present invention is to provide a contact type linear image sensor which is free from the feed-through noise as mentioned above.

Still another object of the present invention is to provide a contact type image sensor which have high abilities to obtain a higher scanning speed and a higher resolution than a MOSIC circuit and which can discriminate half tone.

A still further object of the present invention is to provide a contact type image sensor using CCD driving circuit free of the aforementioned image lag.

A more further object of the present invention is to provide a method of driving such a sensor.

The above and other objects of the present invention is accomplished according to a first aspect of the present invention by a contact type image sensor which comprises a plurality of photodetectors; a plurality of driving circuits each of which includes one charge shift register having a plurality of stages, an output amplifier connected to the output of the charge shift register, a change-over switch means connected to the output of the output amplifier, and a plurality of transfer gate means connected between respective stages of the charge shift register and the corresponding ones of the photodetectors in a one-to-one relation; and a common output line connected to the outputs of the change-over switch means of all the driving circuits.

With the above arrangement, an electric charge in each of the photodetectors is transferred to the corresponding stage of the charge shift registers by turning on the transfer gate means. Thereafter, by applying transfer clock pulses to a selected one of the charge shift registers and turning on the change-over switch means associated the selected one charge shift register, photosignals temporarily stored in the selected one charge shift register are outputted through the associated output amplifier and the associated change-over switch means to the common output line.

In one embodiment of the image sensor in accordance with the present invention, each of the transfer gate means of all the driving circuits has a controlled input connected in common to one control terminal. Preferably, each of the transfer gate means is a MOSFET having a gate connected in common to the one control terminal. In addition, the output amplifier of each driving circuit is a floating gate amplifier connected to the final stage of the associated charge shift register, and the change-over switch means of each driving circuit is a CMOS circuit. Furthermore, the charge shift registers are preferably formed by CTD shift registers such as CCD registers.

In another embodiment of the image sensor, the charge shift registers are CCD shift registers, and each of the driving circuits further includes an auxiliary transfer gate means connected between each of the transfer gate means and the corresponding photodetector, and means for injecting bias charge to all the stages of the CCD shift register. With this arrangement, after the CCD shift register is injected with the bias charge, the transfer gate means and the auxiliary transfer gate means are simultaneously and twice turned on in such a manner that, upon the first turning-on, the bias charges in the CCD shift register are transferred to the corresponding photodetectors, and upon the second turning-on, the photoelectric charges plus the bias charges are transferred from the respective photodetectors to the corresponding stages of the CCD shift register.

In this embodiment, preferably, each of the transfer gate means has a controlled input connected in common to a first control terminal, and each of the auxiliary transfer gate means has a controlled input connected in common to a second control terminal. In addition, each of the charge injection means includes a diode means connected to a voltage source, and a injection gate means connected between the diode means and the first stage of the associated CCD shift register.

Furthermore, according to a second aspect of the present invention, there is provided a driving method for a contact type image sensor which includes a plurality of photodetectors; a plurality of driving circuits each of which includes one charge shift register having a plurality of stages, an output amplifier connected to the output of the charge shift register, a change-over switch means connected to the output of the output amplifier, and a plurality of transfer gate means connected between respective stages of the charge shift register and the corresponding ones of the photodetectors in a one-to-one relation; and a common output line connected to the output of the change-over switch means of all the driving circuits. This driving method includes the steps of simultaneously turning on the transfer gate means of all the driving circuits, so as to transfer an electric charge stored in each of the photodetectors to the corresponding stages of the charge shift registers; sequentially driving the charge shift registers one by one in the direction of arrangement of the photodetectors, by supplying transfer clock pulses only to a selected one of the charge shift registers and at the same time turning on only the change-over switch means associated to the selected charge shift register during only the period of time in which the transfer pulses are applied; and repeatedly carrying out the above two steps.

In the case that the charge shift registers are made of CCD shift registers, and each of the driving circuits further includes an auxiliary transfer gate means connected between each of the transfer gate means and the corresponding photodetector, and means for injecting bias charge to all the stages of the CCD shift register, the driving method for the image sensor additionally includes the steps of injecting the bias charge to the CCD shift register; and simultaneously turning on the transfer gate means and the auxiliary transfer gate means twice in such a manner that, upon the first turning-on, the bias charges in the CCD shift register are transferred to the corresponding photodetectors, and upon the second turning-on, the photoelectric charges plus the bias charges are transferred from the respective photodetectors to the corresponding stages of the CCD shift register.

Preferably, each of the transfer gate means is a MOSFET whose gate is connected in common to a first control terminal, and each of the auxiliary transfer gate means is another MOSFET whose gate is connected in common to a second control terminal. In such a case, the first turning-on is carried out by applying a first gate pulse to the gate of the first MOSFET and at the same time supplying the gate of the second MOSFET with a second gate pulse having a voltage higher than that of the first gate pulse, and the second turning-on is carried out by simultaneously supplying the gates of the first and second MOSFETs with the gate pulses of the voltages which are substantially the same as each other but lower than that of the second gate pulse.

In addition, the charge injection means includes a diode means connected to a voltage source, and a injection gate means connected between the diode means and the first stage of the associated CCD shift register. With this arrangement, the injection of the bias charge to the CCD shift register is carried out by applying the injection gate means with injection gate pulses which are of the same number as that of the transfer pulses but are time-delayed from the transfer pulses by the length of time corresponding to one period of the transfer pulses, so that a bias charge is injected to the first stage of the CCD shift register and transferred stage by stage to the succeeding stages of the same CCD shift register in synchronism with the transfer of the photosignal through the same CCD shift register.

The above and other objects, features and advantages of the present invention will become apparent from the following description taken in conjunction with the embodiments thereof with reference to the accompanying drawings.

DESCRIPTION OF THE PREFERRED EMBODIMENTS

Figure 1:
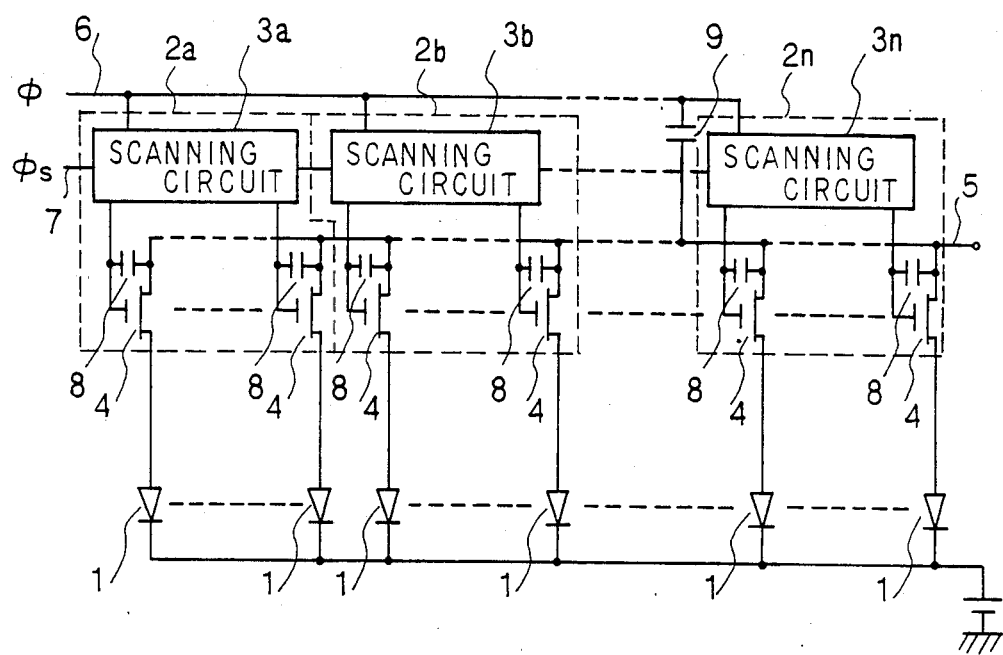
FIG. 1 is a circuit diagram showing a basic construction of a contact type image sensor in the prior art.
Figure 2:
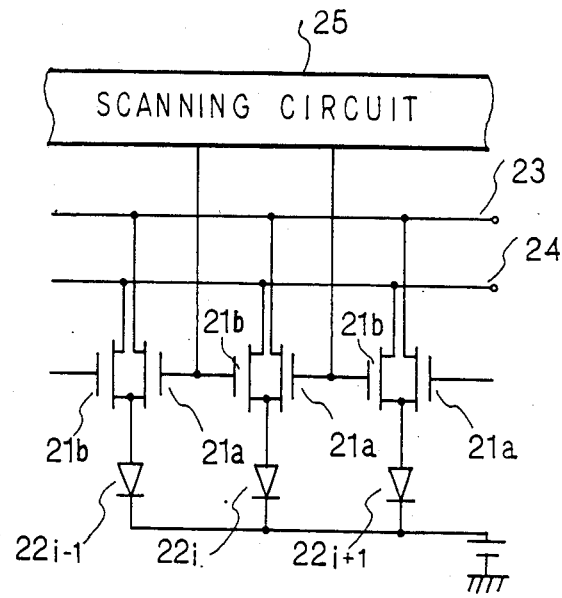
FIGS. 2 and 3 are circuit diagrams of MOSIC image sensor in the prior art in which the conventional noise suppression methods are carried out respectively.
Figure 3:
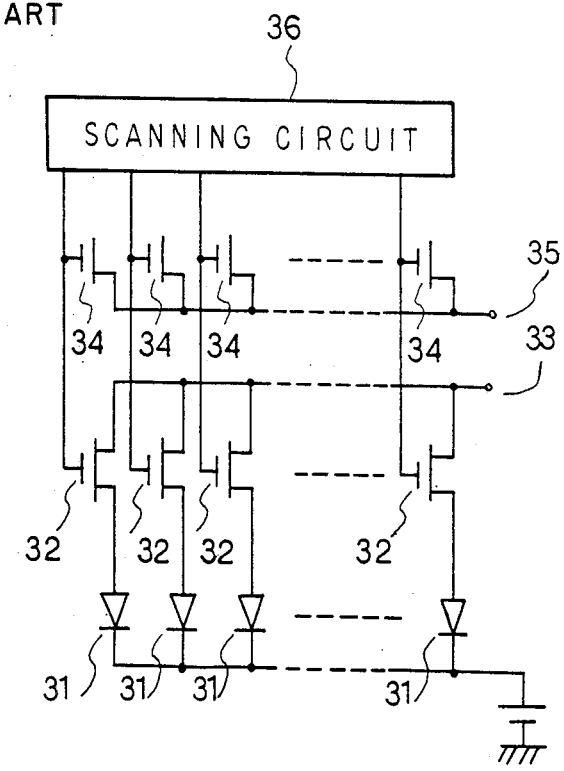
Figure 4:
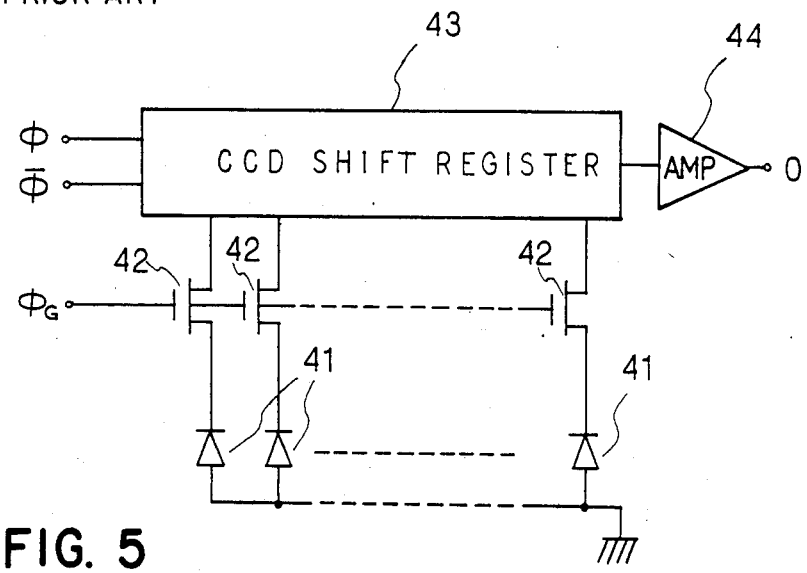
FIG. 4 is a circuit diagram showing a basic construction of a CCD image sensor in the prior art.
Figure 5:
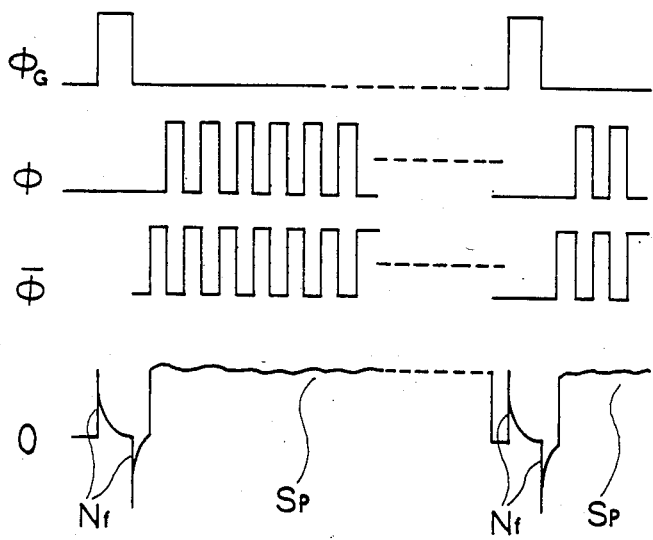
FIG. 5 is a waveform diagram showing driving pulses for the CCD image sensor shown in FIG. 4 and the output signal of the same sensor.

The present invention will be described in the following with reference to FIGS. 6 to 9, in which like Reference Numerals indicate like or corresponding components of the contact type CCD image sensor.

Figure 6:
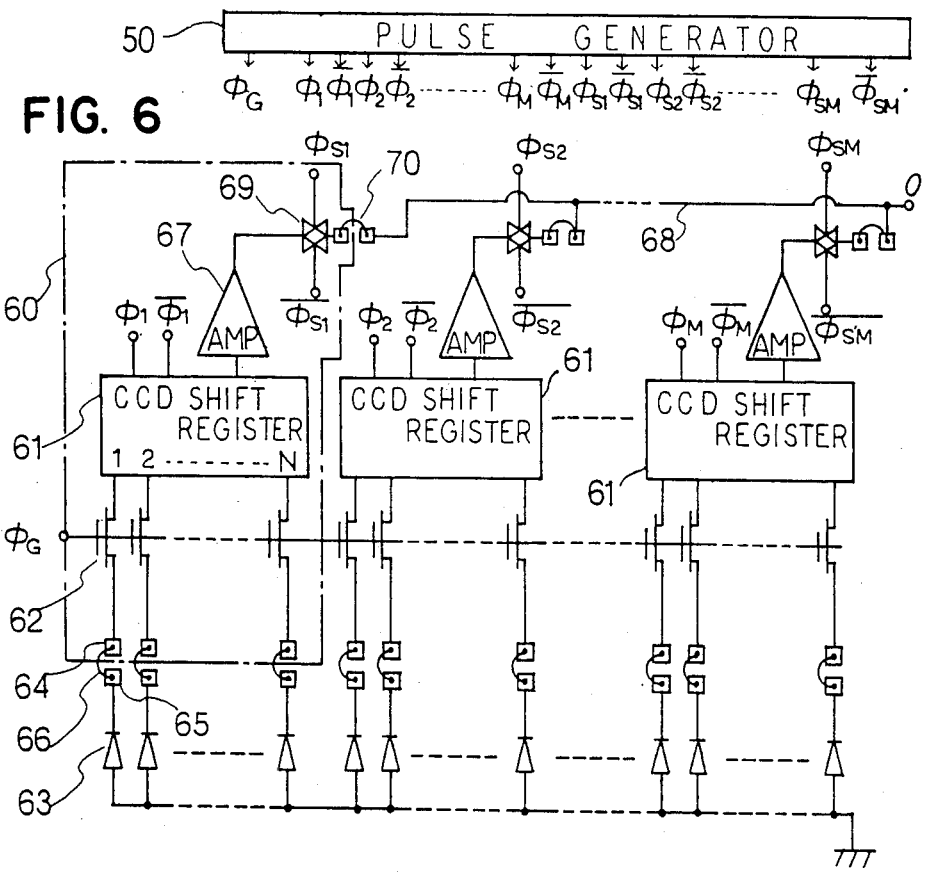
FIG. 6 is a circuit diagram showing a first preferred embodiment of a contact type CCD image sensor according to the present invention.

Referring to FIG. 6, a first preferred embodiment of the contact type CCD image sensor in accordance with the present invention comprises M integrated circuit chips 60, each of which includes one CCD shift register 61 formed on a semiconductor substrate and having N cascade-connected stages. For example, this shift register 61 is a two-phase driven buried-channel type CCD shift register having a high transfer efficiency. By alternately supplying the two clock inputs of the respective CCD shift registers with first transfer clock pulses $\phi_1 \sim \phi_M$ and second inverted transfer clock pulses $\overline{\phi_1} \sim \overline{\phi_M}$ from a pulse generator 50, respectively, the electric charge stored in each stage in the CCD shift register is transferred stage by stage to the succeeding stages at each pair of first and second transfer clock pulses, with the result that the electric charge signal is serially outputted from an output terminal of each CCD shift register.

Each of the stages 1 ... N of each CCD shift register is connected at its input to one transfer gate 62 constituted of for example one MOSFET as shown in FIG. 6. Each of the MOSFET transfer gates 62 is connected to one photodetector cell 63 through a bonding pads 64 and 65 bridged by a bonding wire 66. Each of the photodetector cells is, for example, composed of an amorphous silicon film held between an individual metal electrode formed on an insulating substrate (not shown) such as glass and a common transparent electrode, so that all the photodetector cells are arranged in the form of one straight line. For example, the individual electrode is made of Au, and the common transparent electrode is made of ITO (Indium Tin Oxide). Thus, the transfer gates 62 correspond to the photodetector cell 63 in one-to-one relation, and therefore, by applying a transfer pulse $\phi_G$ to all the transfer gates 62, the electric charge stored in each photodetector 63 are simultaneously transferred through the associated transfer gate 62 to the corresponding stage of the CCD shift registers 61.

Furthermore, each of the CCD shift registers 61 is connected at its output to a floating gate amplifier 67, whose output is connected to a common output line 68 through an output change-over switch 69 and a bonding wire 70. This switch 69 is constituted of for example a CMOS circuit which includes a pair of p-channel MOSFET and n-channel MOSFET turned on by a pair of gate pulses $\phi_S$ and $\overline{\phi_S}$ inverted in phase to each other.

In this way, each CCD driving integrated circuit chip 60 comprises the N-stage CCD shift register 61, the N transfer gates 62, the floating gate amplifier 67 and the switch 69. The M chips 60 are assembled and attached on the substrate formed with the [N×M] photodetector cells 63. The gates of all the MOSFET transfer gates 62 in the M chips (i.e. [M×N] transfer gates) are connected in common to a control terminal, so that these gates are simultaneously turned on and off. Therefore, in the case that a contact type CCD image sensor for A-4, size and having 16 elements/mm resolution is fabricated by using CCD shift registers of 256 stages/chip, 14 chips 60 have to be assembled on the substrate formed with 3456 photodetectors 63.

The method of driving the aforementioned image sensor will then described with reference to FIG. 7.

First, at the time $t_o$, the transfer pulse is $\phi_G$ is applied to all the transfer gates 62, so that the transfer gates are turned on at the same time in order to simultaneously transfer the photoelectric charges stored in all the photodetectors 63 to the corresponding stages of all the CCD shift registers 61.

After a predetermined time has elapsed from the falling time $t_1$ of the transfer pulse $\phi_G$ to allow the feed-through noise $N_f$ to disappear, the transfer clock pulses $\phi_1$ and $\overline{\phi_1}$ are applied to only the first CCD shift register 61 so as to transfer the charges in the respective stages of the first register 61 to the succeeding stages, stage by stage. The photoelectric charge in each stage is transferred one stage by one pair of clock pulses $\phi_1$ and $\overline{\phi}_1$, and therefore, N pairs of clock pulses $\phi_1$ and $\overline{\phi}_1$ are applied to the CCD shift register 61, so that all the photoelectric charges temporarily stored in the first to Nth stages of the first CCD shift register 61 are sequentially outputted to the associated 67.

On the other hand, the gate pulses $\phi_{S1}$ and $\overline{\phi}_{S1}$ are applied to the output change-over switch 69 of the first CCD shift register 60 so that the switch 69 is turned on. The gate pulse $\phi_{S1}$ has a high level period corresponding to the period of time in which the N clock pulses $\phi_1$ are sequentially applied, and the gate pulse $\overline{\phi}_{S1}$ is reverse in phase to the gate pulse $\phi_{S1}$. However, no gate pulse is applied to the switches 69 of the second to Nth CCD shift registers 61, so that these switches are kept in an OFF state. Thus, the photoelectric charges in the respective stages of the first CCD shift register 61 are sequentially outputted through the switch 69 to the common output line 68, but, the photoelectric charges stored in all the registers 60 except the first one are not transferred and remain stored there in the period of time $t_{S1} - t_{S2}$.

After the readout of the output signals of the first CCD shift register 61, the transfer clock pulses $\phi_2$ and $\overline{\phi}_2$ are then applied to the second CCD shift register 61 and the output change-over switch 69 associated to the second CCD register is turned on by the gate pulses $\phi_{S2}$ and $\overline{\phi}_{S2}$. Neither the transfer clock pulses nor the gate pulses are applied to the CCD shift registers 61 excluding the second one. Therefore, the photosignal stored in the second CCD register 61 are sequentially transferred and then outputted to the output line 68.

Hereinafter, the same operations are sequentially practiced on the third CCD shift register to the Mth CCD register in order.

Figure 7:
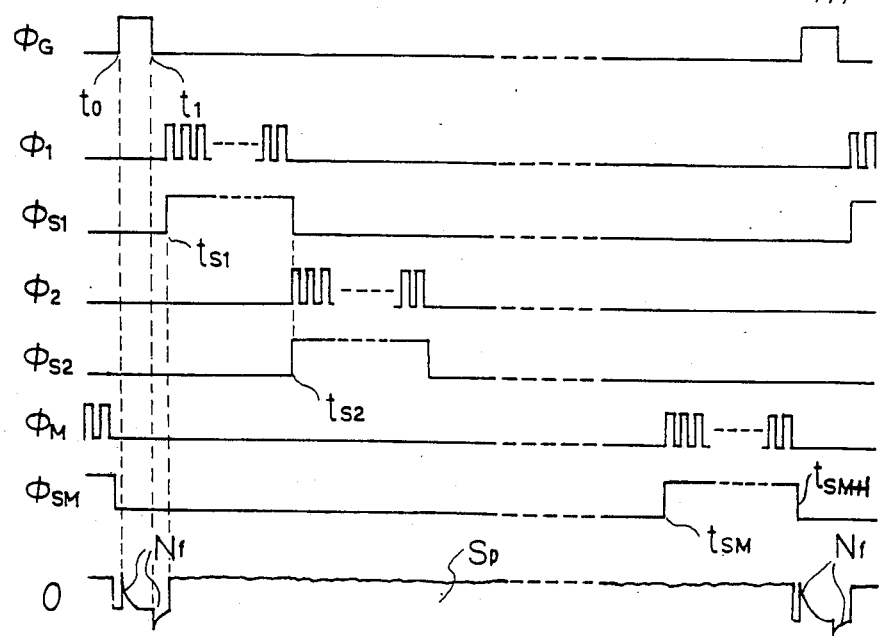
FIG. 7 is a time chart of various driving pulses for the CCD image sensor shown in FIG. 6 and a waveform diagram of the output signal of the same sensor.

Thus, the photoelectric charges in the [N×M] photodetectors 63 are successively read out, so that the photosignal as shown in FIG. 7 are outputted to the common output line 68.

In this first preferred embodiment, each transfer gate 62 is turned on only once during a scanning time for each one line, but out of the period $t_{S1} - t_{SM+1}$ of reading photosignals from the CCD shift registers. Therefore, the feed-through noises $N_f$ caused by triggering the transfer gates 62 will not be contained in the photosignals outputted through the output line 68. In this connection, another feed-through noises will be generated by the pulses $\phi_{S1} \sim \phi_{SM}$ and $\overline{\phi}_{S1} \sim \overline{\phi}_{SM}$ applied to the output change-over switches 69. But, this is negligible, because such feed-through noise will in general be not greater than 1 mV, and on the other hand, the photosignals are amplified by the floating gate amplifiers 63 to have a value of about 1 V for example.

In place of CMOS switch, a MOS switch of P-channel or N-channel can be used as an output change-over switch 69. However, the CMOS switch has the advantage capable of cancelling the noises by a pair of positive and negative pulses, as mentioned hereinbefore.

When one change-over switch 69 on one chip is in ON-state, the switches 69 on the other chips are in OFF-state. Any short circuit is not, therefore, caused even if the outputs of all the floating gate amplifiers are connected the common output line 68. As the result, there is no necessity for providing more than one output line for one contact type image sensor.

In the aforementioned CCD contact type linear image sensor, the photoelectric charge stored in each photodetector is intermittently transferred to the CCD shift register. Therefore, the charge given by a dark current is stored in the CCD shift register during a period of time from the moment the transfer of charge from that CCD shift register has been completed to the moment the next transfer of charge from the same CCD shift register is started. In this embodiment, however, such a dark charge does not become a substantial cause of noise to the photosignal.

For example, in case of a contact type image sensor for A-4, size having 16 elements/mm resolution and driven at 1 msec/line scanning speed, the photoelectric charge of about 0.2 pC is stored under illumination of 100 1 x (wavelength 555 nm) and the photodetector aperture size of 0.05×0.06 mm$^2$. On the other hand, the dark charge stored in the CCD shift register 61 is about $1 \times 10^{-4}$ pC at the scanning speed of 1 msec/line. Therefore, the noise caused by the dark charge is negligible since this dark charge is extremely smaller than the photoelectric charge.

Figure 8:
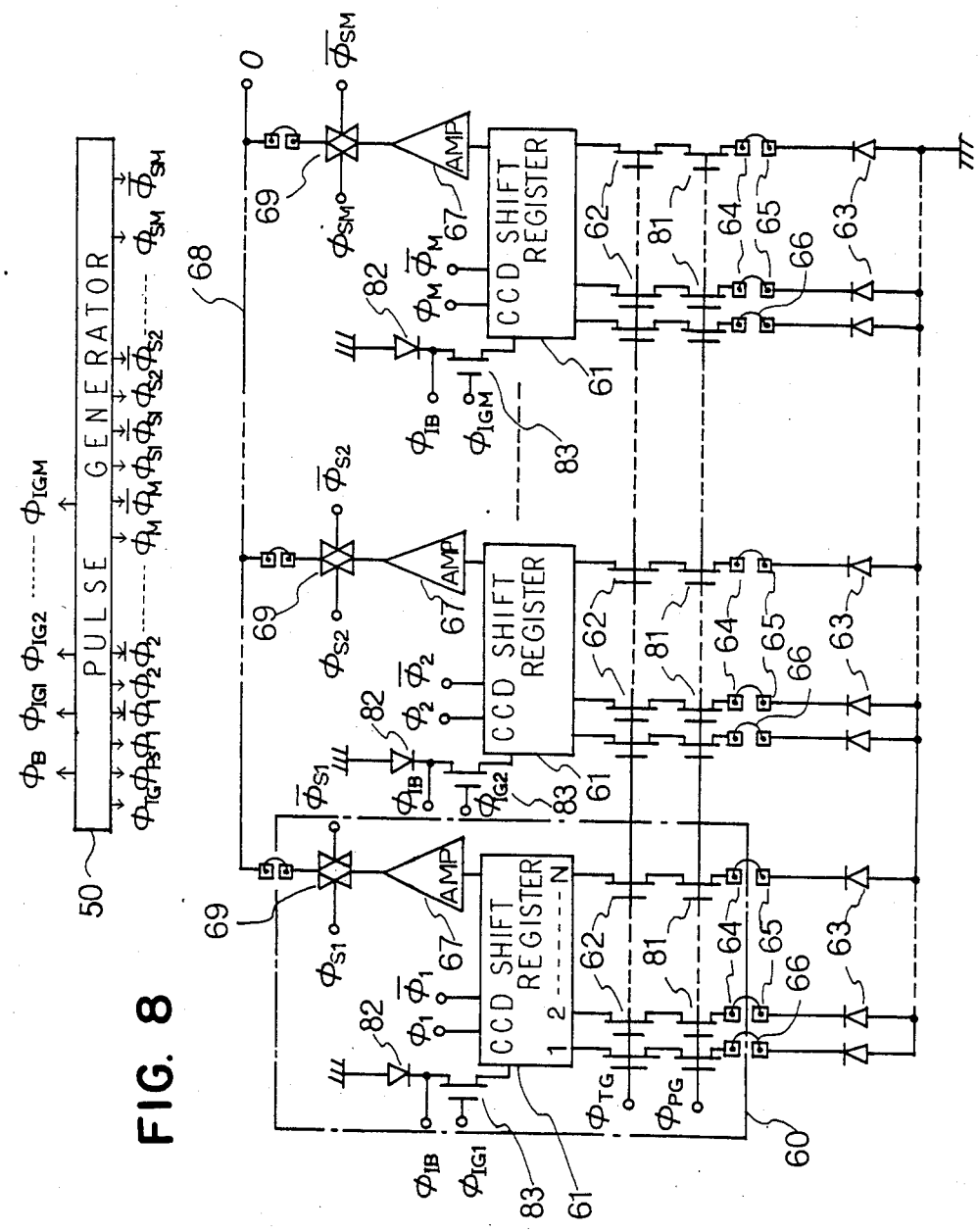
FIG. 8 is a circuit diagram showing a second preferred embodiment of a contact type CCD image sensor according to the present invention.

Referring to FIG. 8, there is shown a second preferred embodiment of the CCD contact type linear image sensor in accordance with the present invention. This second embodiment is an improvement to the first embodiment, and therefore, components similar to those of the first embodiment shown in FIG. 6 are given the same Reference Numerals. Namely, the second embodiment also comprises M photodetector readingout IC chip 60 each of which includes a N stage CCD shift register 61 having an output connected through a floating gate amplifier 67 and a CMOS type changeover switch 69 to a common output line 68. Each stage of the CCD shift register 61 is connected to the corresponding one photodetector 63 through one transfer gate 62, the bonding pad 64, the bonding wire 66 and the bonding pad 65.

In this second embodiment, a an anxiliary transfer gate 81 is connected between each transfer gate 62 and the associated bonding pad 64. This auxiliary gate 81 is constituted of one MOSFET, similarly to the transfer gate 62. Moreover, a diode 82 is connected through another transfer gate 83 to the first stage of each CCD shift register 61. This diode 82 is reversely biased to constitute a capacitor as shown in FIG. 8, and a potential $\phi_{IB}$ is applied to a connection node between the diode 82 and the associated transfer gate 83. Therefore, by turning on the transfer gate 83, a bias charge is injected from the diode capacitor 82 through the transfer gate 83 to the first stage of the CCD shift register 60.

Similarly to the first embodiment shown in FIG. 6, one N-stage CCD shift register 61, N pairs of transfer gates 62 and auxiliary gates 81, one floating gate amplifier 67, one switch 69, one diode 82 and one transfer gate 83 are manufactured on a single IC chip 60. The M chips 60 are assembled and attached on the substrate formed with the [N×M] photodetectors 63. The gates of all the transfer gates 62 (i.e. [M×N] transfer gates) are connected in common so that all the transfer gates are simultaneously turned on and off. Also, the gates of auxiliary gates 81 are connected in common, so that all the M×N auxiliary gates are turned on and off at one time. In addition, in the case that a contact type CCD image sensor for A-4 size and having 16 elements/mm resolution is fabricated by using CCD shift registers of 256 stages/chip, 14 chips 60 have to be assembled on the substrate formed with 3456 photodetectors 63.

Figure 9:
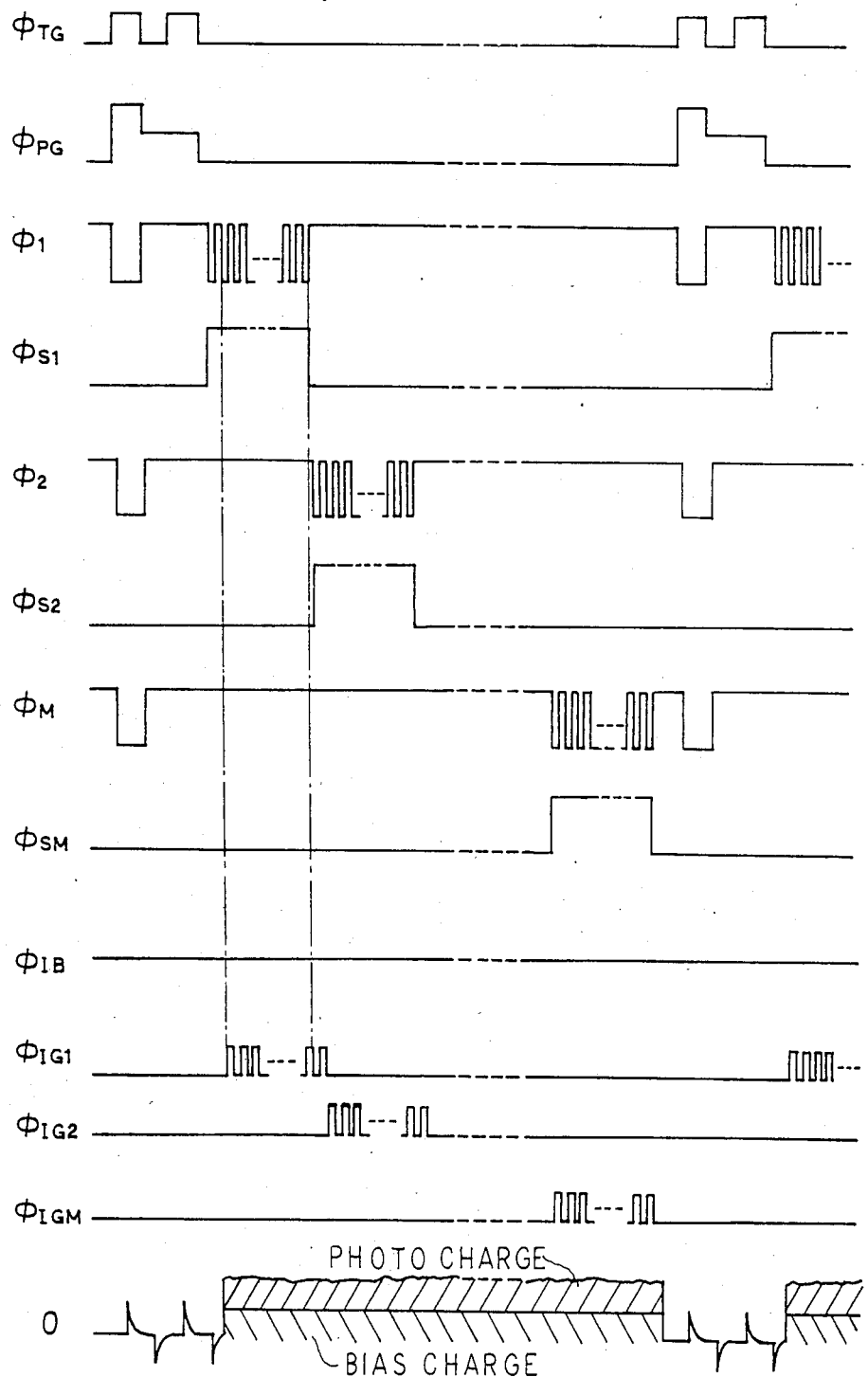
FIG. 9 is a time chart of waveforms similar to Figure 7, but showing those for the image sensor shown in FIG. 8.

The image sensor as mentioned above is operated as follows:

In the condition that the CCD shift registers 60 are precharged in the manner as explained hereinafter, the M×N transfer gates 62 and the M×N auxiliary gates 81 are simultaneously turned on twice in succession by the transfer gate pulse $\phi_{TG}$ and the auxiliary gate pulse $\phi_{PG}$ as shown in FIG. 9.

Specifically at the first turning-on time, transfer gates 62 and the auxiliary gates 81 are simultaneously turned on, but the auxiliary gates 81 are applied with a gate voltage $\phi_{PG}$ higher than that $\phi_{TG}$ applied to the transfer gates 62 as shown in FIG. 9, so that there is produced such an inclined potential distribution that the potential is the highest under the gate of the CCD shift register and is lowered step by step toward the transfer gate and the auxiliary gate and then becomes the lowest under the photodetector. Accordingly, the bias charge stored in each stage of the CCD shift register is transferred or injected to the associated photodetector, with the result that the photoelectric charge plus the bias charge is stored in the photodetector.

At the second turning-on time, the transfer gates 62 and the auxiliary gates 81 are applied with the same gate voltages $\phi_{TG}$ and $\phi_{PG}$ as shown in FIG. 9, resulting in production of such a potential distribution that the potential is the highest under the photodetector and is lowered at the auxiliary gate and the transfer gate and then becomes the lowest under the gate of the CCD shift register. Thus, the photoelectric charge plus the bias charge in the respective photodetector is transferred to the corresponding stage of the CCD shift register.

Namely, even if the photosignal voltage across the photodetector is very small, since the photosignal voltage is increased with a bias voltage as mentioned above, the photosignal voltage is quickly and surely transferred from the photodetector to the CCD shift register when the transfer gate and the auxiliary gate are turned on. This CCD image sensor is free from the problem of the persistence of charge mentioned hereinbefore caused by a small quantity of photoelectric charge stored in the photodetector.

Thereafter, the transfer clock pulses $\phi_I$ as shown in FIG. 9 and the inverted transfer clock pulses $\overline{\phi_I}$ are applied to only the first CCD shift register 61 so as to transfer the charges in the respective stages of the same register 61 to the succeeding stages, stage by stage, and to finally output the photosignal from the output terminal to the amplifier 67. At the same time, the gate pulse $\phi_{S1}$ shown in FIG. 9 and the inverted gate pulse $\overline{\phi_{S1}}$ are applied to the output change-over switch 69 of the first CCD shift register 61 so that the switch is turned on during the period of time in which the transfer clock pulses $\phi_I$ and $\overline{\phi_I}$ are applied. Thus, the photoelectric charges in the respective stages of the first CCD shift register 61 are sequentially outputted through the switch 69 to the common output line 68.

At this time, injection gate pulses $\phi_{IG1}$ as shown in FIG. 9 are applied to the injection gate 83 connected to the input of the first CCD shift register 61. With intermittent turning-on of the injection gate 83, the charge stored in the capacitor 82 applied with a constant voltage $\phi_{IB}$ from the pulse generator 50 is intermittently injected to the first stage of the first CCD shift register 61. Such an injected charge will be transferred to the next stage in synchronism with the transfer of the photosignal through the CCD shift register. In order to cause all the N stages of the CCD shift register to store the injected charge, N injection gate pulses $\phi_{IG1}$ are applied to the gate 83, but have to be delayed from the transfer clock pulses $\phi_I$ by one period of the transfer pulse $\phi_I$, so that the injected bias charge will not be superimposed with the photoelectric charge being transferred through the CCD shift register. Thus, substantially simultaneously with the completion of the transfer of the photoelectric charge from the first CCD shift register 61, the new bias charge for the next scanning line are stored in each stage of the first CCD shift register 61.

During the aforementioned operation in the first CCD shift register 61 for the photosignal transfer and the injection of the bias charge, the photoelectric charges (plus the bias charges) stored in the CCD shift registers other than the first one will not be transferred and remain stored, similarly to the first embodiment.

After the readout of the photosignals of the first CCD register 61, the transfer clock pulses $\phi_2$ and $\overline{\phi_2}$ are then applied to the second CCD shift register 61 and the output change-over switch 64 associated to the second CCD shift register 61 is turned on by the gate pulses $\phi_{S2}$ and $\overline{\phi_{S2}}$. On the other hand, the injection gate pulses $\phi_{IG2}$ are applied to the injection gate 83 connected to the input of the second CCD shift register 61. Therefore, the photosignal stored in the respective stages of the second CCD shift register 61 are sequentially transferred through the second CCD shift register 61 and finally outputted through the amplifier 67 to the common output line 68, and at the same time, the new bias charge for the next scanning line are stored in the second CCD shift register 61.

Hereinafter, the same operations are sequentially practiced on the third to the Mth CCD shift registers in order.

In this way, the photoelectric charges including the bias charges as shown in FIG. 9 are outputted from an output 0 of the contact type image sensor. Since these bias charges are regarded as DC offset, it is easy to remove the bias charge component in a subsequent process of the signals. Only real photosignals can therefore be obtained.

In this second embodiment, since the photoelectric charges are added with the biasing charges, the voltage across the photodetector 63 becomes higher, with the result that the aforementioned "image lag" is overcome. This bias charge is sufficient if it is of about 0.3 pC. In such a case, if the photoelectric charge stored in each photodetector cell is of about 0.2 pC as mentioned above, the total charge will be of about 0.5 pC. This total charge can be transferred without overflow in a shift register having cell size of 15×30 $\mu m^2$ which is often used in CCD recently.

Incidently, for the purpose of simplification of the drawings, electric power lines and ground lines are omitted. Therefore, it should be understood that the CCD image sensors shown in FIGS. 6 and 8 include power lines, ground lines, etc, which are required in the matter of course in an integrated circuit.

As will be apparent from the above explanation, the contact type CCD image sensor constructed and operated in accordance with the present invention can realize a high scanning speed at a very low noise, since the photoelectric charges in all the photodetectors are simultaneously transferred to a plurality of CCD shift registers which are inherently low in noise characteristics, and then, the photoelectric charges temporarily stored in the CCD shift registers are read out in such a manner that there is omitted the feed-through noise caused at the time of transferring the charge from the photodetectors to the CCD shift register. For example, in case of a contact type image sensor for A-4 size having 16 elements/mm resolution, a S/N ratio of not less than 40 dB can be obtained at a scanning speed of 0.5 msec/line, and therefore, a half tone image can be sufficiently detected or discriminated.

In addition, the image sensor has only one output line. Accordingly, the image sensor can be simply connected to an external circuit, and since only one signal line is required for connection to an external, the reliability in signal transmission to an external will be high.

Furthermore, and as another important advantage of the present invention, the image sensor is very improved in sensitivity by injecting the bias charge to the photodetectors before transferring the photoelectric charge from each photodetector to the CCD shift registers. Namely, since the amount of charge in the photodetector is increased by such an injection of the bias charge, the voltage across the photodetector becomes high, and therefore, the difference in potential between the CCD shift register and the photodetector also becomes large. Accordingly, a substantial amount of charge can be quickly and surely transferred from the photodetector to the shift register, with the result that there is overcome the persistence of charge which is caused because of the capacitance of the photodetectors larger than that of the CCD shift register and because of a relatively small amount of photoelectric charge stored in the photodetector even if the exposure to the photodetector is at maximum. The bias charges are injected or stored into the stages of the CCD shift register, concurrently with the reading-out of the photosignals from the CCD shift register, and the bias charges are simultaneously injected from the respective stages of the CCD shift registers to the corresponding photodetectors. Therefore, the contact type image sensor can have a very high S/N ratio without lowering the scanning speed.

While the invention has been particularly shown and described with reference to preferred embodiments thereof, it will be understood by those skilled in the art that the foregoing and other changes in form and details can be made without departing from the spirit and scope of the invention.

What is claimed is:

1. A contact type image sensor comprising:
   a plurality of photodetectors;
   a plurality of driving circuits each of which includes one charge shift register having a plurality of stages, an output amplifier connected to the output of said charge shift register, a change-over switch means connected to the output of said output amplifier, and a plurality of transfer gate means connected between respective stages of said charge shift register and the corresponding ones of said photodetectors in a one-to-one relation; and
   a common output line connected to the outputs of said change-over switch means of all said driving circuits,
   whereby an electric charge in each of said photodetectors is transferred to the corresponding stage of said charge shift registers with turning-on of said transfer gate means, and then, by applying transfer clock pulses to a selected one of the charge shift registers and turning on the change-over switch means associated said selected one charge shift register, photosignals temporarily stored in said selected one charge shift register are outputted through the associated output amplifier and the associated change-over switch means to said common output line.

2. An image sensor according to claim 1 wherein each of said transfer gate means of all said driving circuits has a controlled input connected in common to one control terminal.

3. An image sensor according to claim 2 wherein each of said transfer gate means is a MOSFET having a gate connected in common to said one control terminal.

4. An image sensor according to claim 1 wherein said output amplifier of each driving circuit is a floating gate amplifier connected to the final stage of the associated charge shift register, and said change-over switch means of each driving circuit is a CMOS circuit.

5. An image sensor according to claim 1 wherein said charge shift registers are CCD shift registers, and each of said driving circuits further includes an auxiliary transfer gate means connected between each of said transfer gate means and the corresponding photodetector, and means for injecting bias charge to all the stages of said CCD shift register, whereby, after said CCD shift register is injected with said bias charge, said transfer gate means and said auxiliary transfer gate means are simultaneously and twice turned on in such a manner that, upon the first turning-on, the bias charges in said CCD shift register are transferred to the corresponding photodetectors, and upon the second turning-on, the photoelectric charges plus the bias charges are transferred from the respective photodetectors to the corresponding stages of said CCD shift register.

6. An image sensor according to claim 5 wherein each of said transfer gate means has a controlled input connected in common to a first control terminal, and each of said auxiliary transfer gate means has a controlled input connected in common to a second control terminal.

7. An image sensor according to claim 6 wherein each of said transfer gate means and said auxiliary transfer gate means includes a MOSFET.

8. An image sensor according to claim 5 wherein each of said charge injection means includes a diode means connected to a voltage source, and a injection gate means connected between said diode means and the first stage of the associated CCD shift register.

9. An image sensor according to claim 8 wherein said diode means is reversely biased.

10. A method for driving a contact type image sensor which includes a plurality of photodetectors; a plurality of driving circuits each of which includes one charge shift register having a plurality of stages, an output amplifier connected to the output of said charge shift register, a change-over switch means connected to the output of said output amplifier, and a plurality of transfer gate means connected between respective stages of said charge shift register and the corresponding ones of said photodetectors in a one-to-one relation; and a common output line connected to the output of said change-over switch means of all said driving circuits, comprising the steps of;
   simultaneously turning on said transfer gate means of all said driving circuits, so as to transfer an electric charge stored in each of said photodetectors to the corresponding stages of said charge shift registers;

sequentially driving said charge shift registers one by one in the direction of arrangement of said photodetectors, by supplying transfer clock pulses only to a selected one of said charge shift registers and at the same time turning on only the change-over switch means associated to said selected charge shift register during only the period of time in which said transfer pulses are applied; and repeatedly carrying out the above two steps.

11. A method according to claim 10 wherein each of said charge shift registers is of the two phase driven type, and wherein first transfer clock pulses $\phi$ and second inverted transfer pulses $\overline{\phi}$ are supplied to said selected charge shift register.

12. A method according to claim 10 wherein each of said change-over switch means is a CMOS circuit having a p-channel MOSFET and a n-channel MOSFET, and wherein said CMOS circuit is turned on by supplying the respective gates of said two MOSFETs with a first gate pulses $\phi_S$ and a second inverted gate pulse $\overline{\phi_S}$ which respectively have the pulse width corresponding to the period of time in which said transfer pulses are applied to the selected charge shift register.

13. A method according to claim 10 wherein said charge shift registers are CCD shift registers, and each of said driving circuits further includes an auxiliary transfer gate means connected between each of said transfer gate means and the corresponding photodetector, and means for injecting bias charge to all the stages of said CCD shift register, and further including the steps of:

injecting the bias charge to said CCD shift register; and simultaneously turning on said transfer gate means and said auxiliary transfer gate means twice in such a manner that, upon the first turning-on, the bias charges in said CCD shift register are transferred to the corresponding photodetectors, and upon the second turning-on, the photo-electric charges plus the bias charges are transferred from the respective photodetectors to the corresponding stages of said CCD shift register.

14. A method according to claim 13 wherein each of said transfer gate means is a MOSFET whose gate is connected in common to a first control terminal, and each of said auxiliary transfer gate means is another MOSFET whose gate is connected in common to a second control terminal, and wherein said first turning-on is carried out by applying a first gate pulse to the gate of said first MOSFET and at the same time supplying the gate of said second MOSFET with a second gate pulse having a voltage higher than that of said first gate pulse, and said second turning-on is carried out by simultaneously supplying the gates of said first and second MOSFETs with gate pulses of the voltages which are substantially the same as each other but lower than that of said second gate pulse.

15. A method according to claim 13 wherein said charge injection means includes a diode means connected to a voltage source, and a injection gate means connected between said diode means and the first stage of the associated CCD shift register, and wherein said injection of the bias charge to said CCD shift register is carried out by applying said injection gate means with injection gate pulses which are of the same number as that of said transfer pulses but are time-delayed from said transfer pulses by the length of time corresponding to one period of said transfer pulses, so that a bias charge is injected to the first stage of said CCD shift register and transferred stage by stage to the succeeding stages of the same CCD shift register in synchronism with the transfer of the photosignal through the same CCD shift register.

* * * * *